United States Patent
Smith et al.

(10) Patent No.: US 9,235,428 B2
(45) Date of Patent: Jan. 12, 2016

(54) USER INTERFACE METHOD AND SYSTEM FOR APPLICATION PROGRAMS IMPLEMENTED WITH COMPONENT ARCHITECTURES

(75) Inventors: Jeffrey A. Smith, Stouffville (CA); Alan Page, Toronto (CA); S. Prassad Maruvada, Newmarket (CA); Scott A. Northmore, Port Carling (CA)

(73) Assignee: Sonic Solutions, Santa Clara, CA (US)

( * ) Notice: Subject to any disclaimer, the term of this patent is extended or adjusted under 35 U.S.C. 154(b) by 2913 days.

(21) Appl. No.: 11/509,503

(22) Filed: Aug. 23, 2006

(65) Prior Publication Data

US 2006/0282787 A1   Dec. 14, 2006

Related U.S. Application Data

(63) Continuation of application No. 09/240,844, filed on Feb. 1, 1999, now Pat. No. 7,117,446.

(51) Int. Cl.
*G06F 9/44* (2006.01)

(52) U.S. Cl.
CPC ........... *G06F 9/4443* (2013.01); *G06T 2200/24* (2013.01)

(58) Field of Classification Search
CPC ......................... G06F 9/4443; G06T 2200/24
USPC .......... 715/762, 700, 866, 744; 345/676, 594, 345/589
See application file for complete search history.

(56) References Cited

U.S. PATENT DOCUMENTS

| | | | | |
|---|---|---|---|---|
| 5,511,197 A * | 4/1996 | Hill et al. | ...................... | 719/328 |
| 5,602,729 A * | 2/1997 | Krueger et al. | ................ | 717/124 |
| 6,038,395 A * | 3/2000 | Chow et al. | .................... | 717/105 |
| 6,314,533 B1 * | 11/2001 | Novik et al. | ..................... | 714/39 |
| 6,385,661 B1 * | 5/2002 | Guthrie et al. | ................. | 719/316 |
| 6,473,407 B1 * | 10/2002 | Ditmer et al. | .................. | 370/252 |
| 6,542,908 B1 * | 4/2003 | Ims | ........................................ | 1/1 |
| 6,558,431 B1 * | 5/2003 | Lynch et al. | ................... | 715/210 |
| 6,766,333 B1 * | 7/2004 | Wu et al. | ................................ | 1/1 |
| 6,775,671 B1 * | 8/2004 | de Lara et al. | ....................... | 1/1 |
| 6,799,320 B1 * | 9/2004 | Elvanoglu et al. | ............ | 719/331 |
| 6,842,175 B1 * | 1/2005 | Schmalstieg et al. | .......... | 345/427 |
| 6,925,466 B2 * | 8/2005 | Jensen et al. | ......................... | 1/1 |
| 7,055,136 B2 * | 5/2006 | Dzoba et al. | ................... | 717/125 |
| 7,117,445 B2 * | 10/2006 | Berger | ........................... | 715/752 |
| 7,117,446 B2 * | 10/2006 | Smith et al. | ..................... | 715/762 |
| 7,168,086 B1 * | 1/2007 | Carpenter et al. | .............. | 725/98 |
| 7,512,896 B2 * | 3/2009 | Rockey et al. | ................. | 715/779 |
| 7,624,356 B1 * | 11/2009 | Rockey et al. | ................. | 715/811 |
| 7,711,984 B2 * | 5/2010 | Tenenti | ............................ | 714/15 |
| 7,865,919 B2 * | 1/2011 | Carpenter et al. | .............. | 725/37 |
| 2002/0167543 A1 * | 11/2002 | Smith et al. | ..................... | 345/762 |
| 2003/0162561 A1 * | 8/2003 | Johnson et al. | ................ | 455/553 |
| 2004/0215600 A1 * | 10/2004 | Aridor et al. | ....................... | 707/3 |

* cited by examiner

*Primary Examiner* — Ece Hur

(74) *Attorney, Agent, or Firm* — Ropes & Gray LLP

(57) ABSTRACT

A computer implemented system is disclosed for providing a graphical user interface (GUI) for an application program. The system includes a renderer, a proxy, and a workflow manager. The renderer is defined to render the GUI. The proxy is defined to provide to the renderer each component necessary for rendering the GUI. The proxy appears to the renderer as a single monolithic application program. The workflow manager is defined to communicate one or more document viewers and their associated user interface components to the proxy for provision to the renderer. The document viewers and their associated user interface components represent components necessary for rendering the GUI.

16 Claims, 7 Drawing Sheets

100

USER INTERFACE METHOD AND SYSTEM FOR APPLICATION PROGRAMS IMPLEMENTED WITH COMPONENT ARCHITECTURES

CLAIM OF PRIORITY

This is a continuation application and claims 35 U.S.C. §120 priority from U.S. patent application Ser. No. 09/240,844, filed on Feb. 1, 1999 now U.S. Pat. No. 7,117,466, and entitled "User Interface Method and System for Application Programs Implemented with Component Architectures," which is incorporated in its entirety herein by reference.

BACKGROUND

The present invention relates to a method and system for providing a user interface for application programs. More specifically, the present invention provides a method and system for providing a graphical user interface for application programs implemented with component architectures such as COM (Component Object Model), DCOM (Distributed Component Object Model), CORBA (Common Object Request Broker Architecture) and the like.

Applications programs with graphical user interfaces (GUI's) are well known and have existed since at least the Xerox Star computer. Initially, such user interfaces were written specifically for each application program, effectively from scratch, and thus required a significant amount of effort to program and debug. More recently GUI's have been implemented with frameworks or architectures provided by operating systems such as Apple's Macintosh or Microsoft's Windows, or by user interface systems such as the X Windows system. In addition to simplifying the construction of a user interface for an application program, each of these frameworks and systems could provide an interface with a common look and feel for application programs implemented under it. For example, most application programs implemented for Apple's Macintosh allowed users to delete files by dragging them to a trashcan icon.

While such GUI's are a significant improvement over early hard-coded GUI's, they still suffer from some disadvantages. For example, the GUI for an application program is usually fixed, and can not easily be updated to include new program features or capabilities without recompiling or reinstalling the entire application program. This is becoming especially problematic as application programs are now being implemented with component architectures, such as COM, DCOM, CORBA and the like, and such architectures permit new capabilities and/or features to be added to existing application programs by adding or changing appropriate modules of the program. To date, the updating of the GUI for such component implemented programs has not been easy to accomplish.

A further disadvantage exists in that, while a common look and feel may be available for programs implemented in a particular operating system or GUI system, this look and feel is generally not independent of the operating system or GUI system and thus the user must be retrained, to some extent, to use even the same program when it is run on a different operating system or GUI system.

A relatively recent development in user interfaces has been the adoption and acceptance of the world wide web and it's associated html-based browser paradigm. Despite limitations in early versions of html, the web browser paradigm is now widely employed and most users are familiar with it to some extent. Recent versions of html, especially dynamic html (DHTML), have removed some of the limitations of earlier versions, such as the requirement to employ java applets or to reload the entire page in order to update material on a web page. However, html-based browsers are still limited in the uses to which they can be put and they do not, by themselves, provide the services and features required to implement a GUI for an application program, especially not for an application program implemented in a component architecture.

It is desired to have a user interface method and system which allows the web browser paradigm, or the like, to be employed as the GUI for application programs implemented with a component architecture.

SUMMARY

In one embodiment, a computer implemented system is disclosed for providing a graphical user interface (GUI) for an application program. The system includes a renderer, a proxy, and a workflow manager. The renderer is defined to render the GUI for the application program. The proxy is defined to provide to the renderer each component necessary for rendering the GUI. The proxy appears to the renderer as a single monolithic application program. The workflow manager is defined to communicate one or more document viewers and their associated user interface components to the proxy for provision to the renderer as components necessary for rendering the GUI.

In another embodiment, a method is disclosed for providing a GUI for an application program. The method includes operating a renderer to render the GUI for the application program. The method also includes operating a proxy to provide to the renderer each component necessary for rendering the GUI. The proxy appears to the renderer as a single monolithic application program. The method further includes operating a workflow manager to communicate one or more document viewers and their associated user interface components to the proxy for provision to the renderer as components necessary for rendering the GUI.

Other aspects and advantages of the invention will become more apparent from the following detailed description, taken in conjunction with the accompanying drawings, illustrating by way of example the present invention.

DETAILED DESCRIPTION

Figure 1:
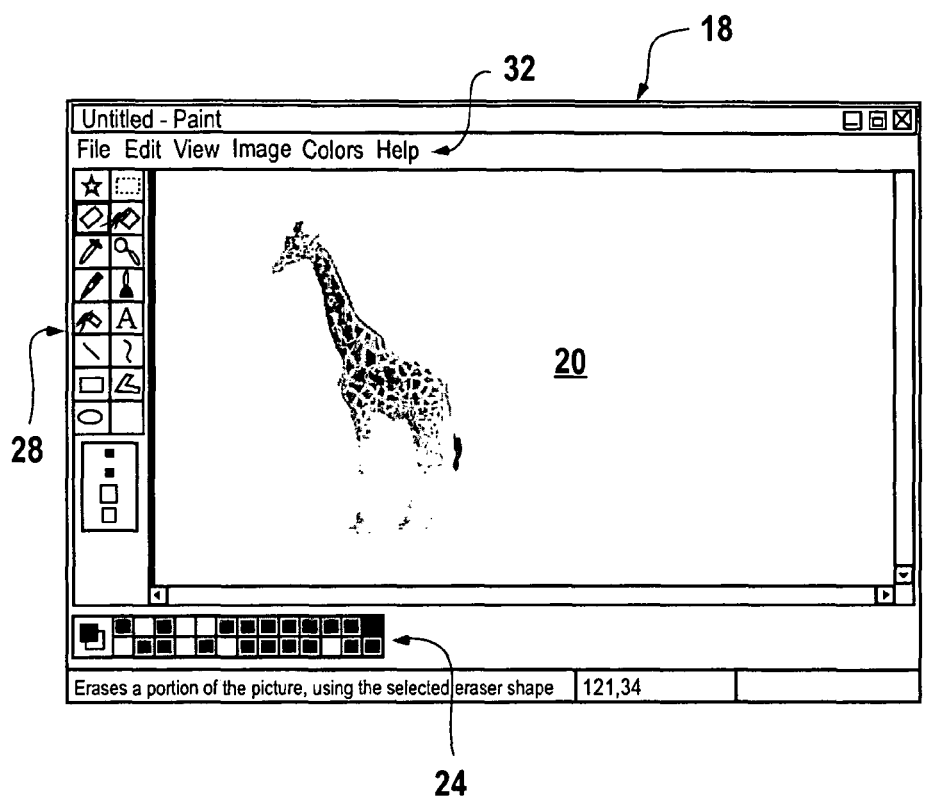
FIG. 1 shows a conventional GUI for an application program, the GUI being implemented in Windows 98.

FIG. 1 shows the graphical user interface of the Microsoft Paint application program included with Windows 98. As shown, the graphical user interface 16 includes a graphic edit area 20, tool bars 24 and 28, and menu bar 32. Tool bars 24 and 28 can be dynamically updated, to display other tools as the context of the program is changed, for example by selecting a different tool. Typically, GUI's such as that shown in FIG. 1 are specifically programmed for the operating system and/or programming tools employed. For example, GUI's such as that shown in FIG. 1 are commonly implemented within the framework provided by the Microsoft Foundation Classes (MFC) which employ various user interface functions provided within the Windows 98 operating system.

Once the GUI is implemented, the display of the GUI to the user is accomplished by the application program calling various operating system and/or GUI functions to create the needed display objects. Like many such programs, the Paint program is monolithic and new capabilities or features can only be added by rewriting and recompiling at least a portion of the program.

Figure 2:
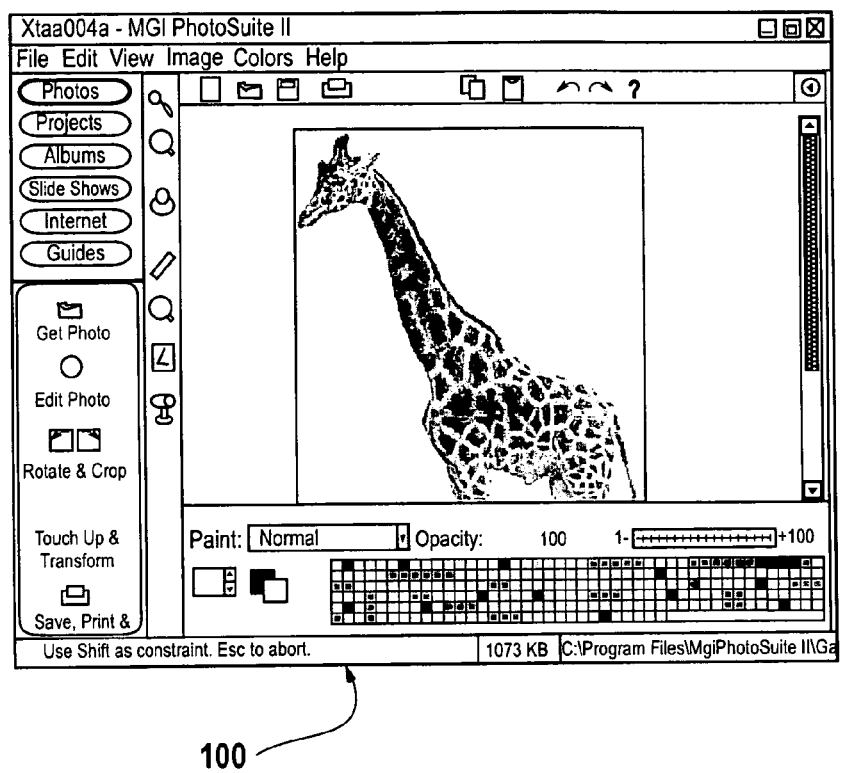
FIG. 2 shows a GUI for an application program in accordance with the present invention, the GUI being rendered by a DHTML browser.

In contrast, FIG. 2 shows a GUI 100 in accordance with the present invention. While the display of GUI 100 appears to be generally similar to that of FIG. 1, it is in fact constructed and displayed in a much different manner. Specifically, GUI 100 of FIG. 2 has been rendered by a platform independent renderer, in this specific case, an DHTML browser.

Figure 3:
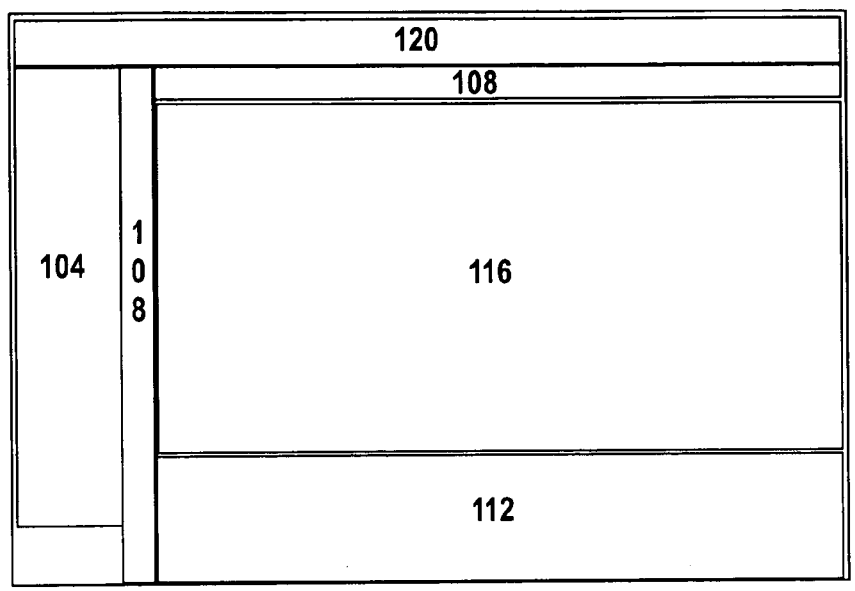
FIG. 3 shows a schematic representation of the components of the GUI of FIG. 2.

FIG. 3 indicates the specific components of the GUI 100, which are arranged in frames within the DHTML browser. Frames 104, 108 and 112 include a variety of controls and other user interface components appropriate to the application program and it's present context. Frame 116 includes a document viewer and the DHTML browser itself includes a conventional menu bar 120.

Figure 4:
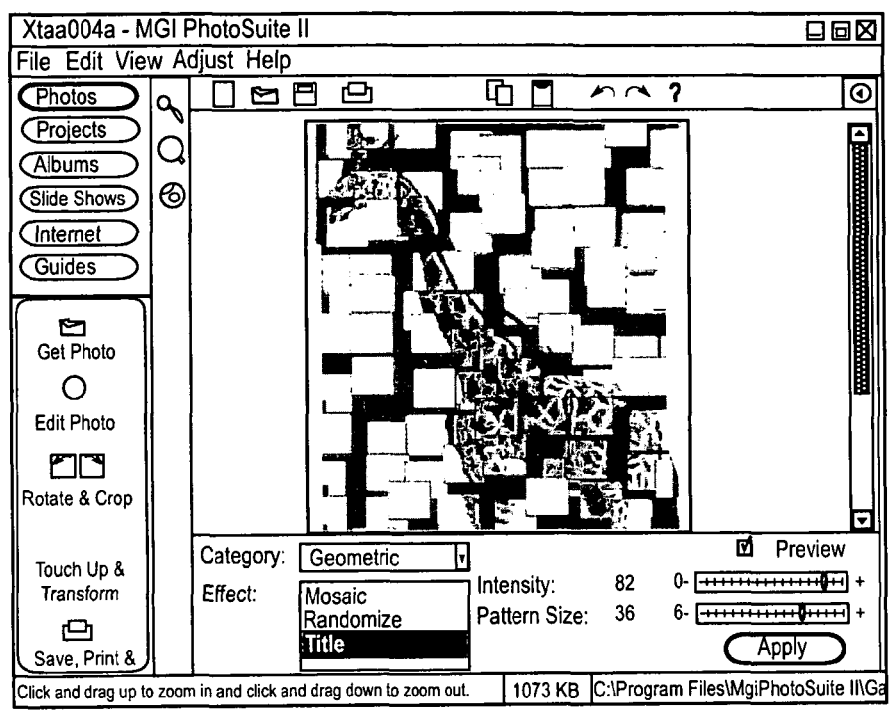
FIG. 4 shows the GUI of FIG. 2 when the application program is in a different context.
Figure 5:
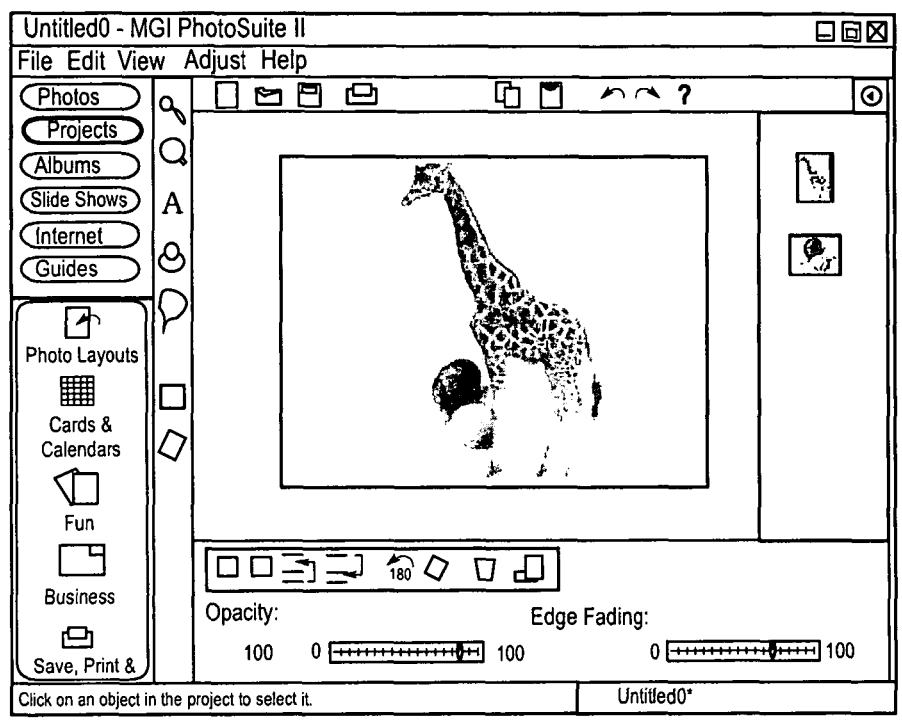
FIG. 5 shows the GUI of FIG. 2 when the application program is in yet a different context.

In FIG. 2, the application program is shown in an "Edit Picture" mode. As the context of the application changes, one or more frames of GUI 100 are updated to display controls and/or viewers appropriate to the new context and/or the layout of the GUI can be changed. For example, FIG. 4 shows a layout for GUI 100 as rendered for a "Special Effects" mode and FIG. 5 shows a layout for GUI 100 as rendered for a "Project Creation" mode. As will be apparent, in each case an appropriate set of controls and other user interface components and document viewer is rendered. Also, as shown, the number, size and positioning of the frames rendered can be changed as the context changes. For example, in FIG. 5 an additional document viewer frame has been added down along the right hand side of GUI 100 and on which the images available within the project are displayed.

Figure 6:
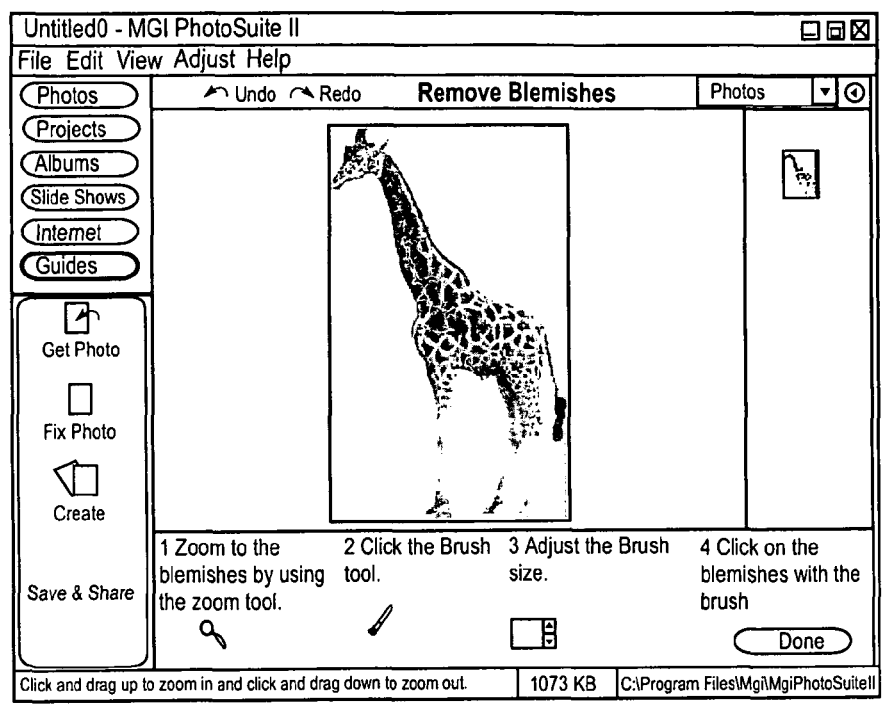
FIG. 6 shows the GUI of FIG. 2, with a different layout, when the application program is in yet another context.

If any particular context of the application program is best suited by a different layout, rather than merely by changing the number, size and positioning of frames and/or the updating of appropriate sets of user interface tools which are used in one or more other contexts, the DHTML layout can be changed. FIG. 6 shows an example of a Guided Activity context which has a significantly different layout to those shown in FIGS. 4 and 5. In this context, a user who is less experienced is guided through the performance of a selected action, such as the removal of blemishes from an image, while in the contexts of FIGS. 4 and 5, the experienced user is expected to operate tools, etc. without requiring such guidance. As will be apparent to those of skill in the art, the underlying components of the application program need not be changed if different layouts are employed. As will also be apparent to those of skill in the art, the decision to change layout or to update an existing layout for a context change is one which is subject to the skill and selection of the application programmer. It is contemplated, for example, that in some circumstances wherein a layout for one context could merely be updated for another context, a programmer may decide to instead create a new layout.

Figure 7:
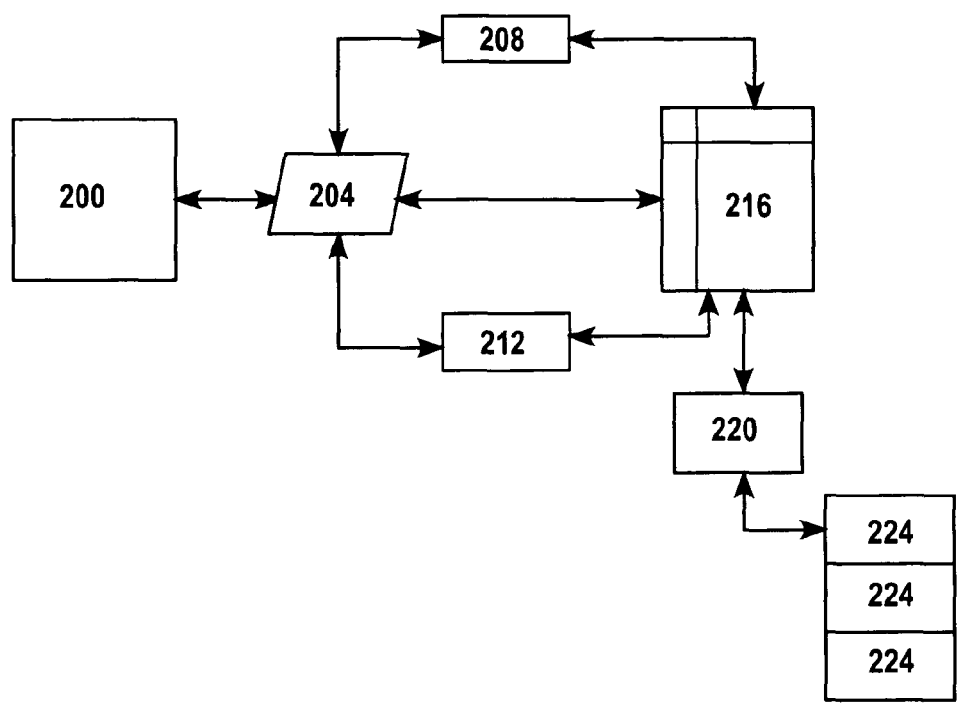
FIG. 7 shows a block diagram of a GUI architecture, in accordance with an embodiment of the present invention.

FIG. 7 shows a block diagram of the architecture employed with the present invention to accomplish the rendering of the application program interface. While this particular architecture is presently preferred, it will be apparent to those of skill in the art that other architectures, embodying the same general principals, can also be employed if desired. The architecture shown in FIG. 7 includes a renderer 200, which communicates with an application proxy 204. A set of presently instantiated user interface components 208 is provided, as is a set of presently instantiated document viewers 212. As used herein, the term user interface is intended to comprise user interface components such as controls, display boxes, etc, and should not be confused with the application program components, also discussed herein. Further, as used herein, the term "document viewer" is intended to comprise both the functions of displaying the current document in an appropriate format and a set of functions and methods appropriate that viewer. For example, an "Edit Picture" viewer can include both the method of displaying a current version of an image and a set of edit methods including paint, erase, brush, undo and redo.

The set of user interface components includes a persistent user interface component and the set of document viewers includes a persistent document viewer which are always instantiated to maintain communications between program components and to persist relevant information if no other user interface component or document viewer respectively is instantiated at any one time. This persistent user interface component and persistent document viewer are not rendered by renderer 200.

Application proxy 204 communicates to renderer 200, to user interface components 208, to document viewers 212 and to a workflow manager 216, which implements each appropriate workflow, as selected by the user or otherwise specified. An active document manager 220 is responsible for handling communications between workflow manager 216 and the currently active one of the one or more documents 224 loaded into the application program. Each of these components is discussed below in more detail.

The examples of the present invention shown in FIGS. 2 through 5 comprise a personal computer based photographic editing and compositing application program. As will be apparent to those of skill in the art, the present invention is not so limited and other application programs can beneficially employ the present invention. For example, desktop publishing, word processing or html authoring application programs can employ the present invention and, in such cases, appropriate sets of user interface components and document viewers will be provided. Further, while the embodiment of the present invention discussed below employs a DHTML browser as renderer 200, the present invention is not so limited and any appropriate renderer can be employed.

As mentioned above, in a current embodiment of the present invention renderer 200 is a DHTML browser. Renderer 200 includes a set of layouts which are therefore stored as DHTML pages defined for the underlying application program, each layout defining a respective GUI organization for a context of the application program. One reason that a DHTML browser is presently preferred to be employed as renderer 200, is that the rich layout feature set of DHTML browsers allows elegant and efficient GUIs to be constructed. Further, sophisticated tools for creating such layouts are readily available.

Also, platform independence of at least the GUI can be achieved, provided that a suitable DHTML browser is available for each platform of interest. This would allow application programs implemented in a client-server arrangement or with DCOM or DCOM-like components to be executed on one platform from a GUI being executed on another platform. If the application program components are implemented in Java, or in another platform independent manner, platform independence of the entire application program and its GUI can also be achieved.

Application proxy 204 serves as the communication conduit between renderer 200 and the components of the application program. To renderer 200, application proxy 204 appears as a single, monolithic application program and all details of the components which make up the application program are essentially hidden from renderer 200 which need only interface to application proxy 204. This also allows other components of the application program to be modified in a manner which is transparent to the renderer. For example, an improved "Edit Picture" document viewer can be substituted in the application program. In this case, renderer 200 will interact with application proxy 204 to render the GUI in the Edit Picture context in the same manner as with the original version of the "Edit Picture" document viewer as the interface between renderer 200 and application proxy 204 does not change.

In embodiments of the present invention wherein renderer 200 is a DHTML browser, application proxy 204 is implemented as a persistent frame, which is not visible to the user, which contains the dynamic link library or other components that implement the application proxy and which can contain any global values or settings employed by renderer 200.

In addition to renderer 200, application proxy 204 also communicates with user interface components 208. These components, which can include controls such as button, sliders, radio buttons, edit boxes, etc., can be implemented in a variety of manners, including as ActiveX controls, Java applets, etc. Application proxy 204 also communicates with document viewers 212 which will include viewers appropriate to observe and interact with data appropriate to the application program, in all of its possible contexts. For example, in the illustrated photographic editing and compositing program, document viewers 212 include an "Edit Picture" viewer, a "Special Effects" viewer, an "Object Manager" viewer, etc.

Each viewer 212 has one or more workflows defined for it. These workflows, which comprise methods, variables and states that are required to be shared among program components and can include, for example: zoom; undo; redo; brush; size; text operations; etc. and also allows various user interface components to be registered with the workflow and can define default values and/or conditions for the workflow. For example, in the case of a zoom workflow, the user interface components associated with the workflow can comprise: a text box (to display the current zoom percentage); a slider (to select the desired zoom percentage); and a default zoom value of one hundred percent.

The management of workflows is performed by workflow manager 216. As a document viewer 212 is instantiated, it's associated workflows are registered with workflow manager 216. Workflow manager 216 manages communication between document viewers 212, user interface components 208 and, through application proxy 204, with renderer 200. Each user interface component 208 for a workflow registers itself with workflow manager 216, as the user interface component is instantiated, to identify the variables it is interested in or deregisters itself with the workflow manager as it is destroyed. For example, a Zoom slider would register that it is interested in a variable "zoom" and will send it messages to that variable if the user interacts with the slider. Further, the workflow manager ensures that the zoom slider receives any updates to the variable "zoom" which have resulted from any changes to the variable from other sources.

Workflow manager 216 also interfaces with active document manager 220 to retrieve and/or to write information to the current active document 224 as required by a workflow. This can include the initial reading of the present active document into the application program for display in a document viewer 212 or the writing of a changed version of the document, as produced by a document viewer 212, or the writing of an undo file for the present active document.

The order in which a workflow is defined is not fixed. For example, if renderer 200 has a layout defined which includes a set of user interface components 208 for a zoom control and a document viewer 212 is loaded for which a zoom workflow is not defined, the set of user interface components 208 register themselves with workflow manager 216 and are displayed in an inoperative or "ghosted" manner by workflow manager 216 as it can not relate them to a variable defined for document viewer 212. When a document viewer 212 is subsequently loaded that has a zoom workflow and/or variable defined, the zoom workflow is registered with workflow manager 216 and matched to the associated set of user interface components 208 and variables which are then shown as being active or un-ghosted. In the more usual circumstance, loading a document viewer 212 will result in an update and re-rendering of the user interface layout by renderer 200, the update changing the user interface components 208 in the layout as required.

While workflow manager 216 primarily communicates with application proxy 204, for efficiency workflow manager 216 can communicate directly with user interface components 208 and with document viewers 212. For example, a user can activate a load new image control, in user interface components 208, which requires the loading of an entire image. User interface components 208 can pass the appropriate message to workflow manager 216 which in turn obtains the document information from the active document 224 via active document manager 220 and forwards the document information directly to document viewer 212.

In addition to changes to the active document, active document manager 220 is also responsible for writing or otherwise persisting information relating to the present state and context of the application program relative to the active document. For example, if the document is being viewed in a document viewer 212 at a zoom setting of two hundred percent, this setting is stored by active document manager 220 with the active document 224 for that context. If a context change occurs in the application, for example in response to a user interface event, and a different document viewer is loaded where zoom is not provided and another context change subsequently occurs loading a document viewer where zoom is provided, active document 224 will be displayed at the previously set zoom of two hundred percent by recovering the stored zoom rate information.

When a context change, or other event requiring a display update, occurs within the application program, either as a result of a user interface event or another event, a message is sent by application proxy 204 to renderer 200. Application proxy 204 is responsible for determining the changes required to be made to the application program user interface, whether these changes require rendering of a new layout or the updating of the present layout. In response to the received message, renderer 200 will then re-render the application program user interface to dynamically update the display to reflect the changes indicated by application proxy 204 resulting from the context change or other event. When renderer 200 re-renders the application program user, any updated elements are provided by workflow manager 216. These elements comprise the user interface components 208 defined for the present context, the document viewer or viewers 212 defined for the present context and the present active document 224.

As mentioned above, application programs used with the present invention can be implemented with components, such as COM, DCOM or CORBA objects. Application proxy 204 serves to marshal the information from each component of the application program to renderer 200, such that, to renderer 200, application proxy 204 appears as a monolithic application program.

In the photographic editing and compositing example discussed herein, user interface components 208 are implemented as ActiveX controls or Java applets. Document viewers 212 are also implemented as COM objects, each having at least one defined workflow which can be registered with workflow manager 216, as mentioned above.

If renderer 200 is a DHTML browser, or the like, it is also possible to implement one or more or all of user interface components 208 in the DHTML layout, with Javascripts or the like, and a callback to application proxy 204 can be effected upon the defined user interface event occurring in the browser. These Javascript or other implemented controls can also be used to update the display produced by renderer 200, if desired, thus allowing the present invention to employ generic HTML-based controls and obviating the need to write custom ActiveX controls or the like.

One of the advantages provided by component architectures is that new or different components can be added or employed as desired. With the present invention, providing appropriate changes to the GUI of an application in accordance with the addition or alteration of components is easily accomplished. For example, if a new or enhanced document viewer component is added to the photographic editing and compositing application discussed herein, the workflows associated with the document viewer are registered with workflow manager 216, using an appropriate workflow registration method. User interface components required by the document viewer component are instantiated if necessary and registered with workflow manager 216 and appropriate default values or conditions (if any) are defined. The new or enhanced document viewer component is then ready for use with the application program. As will be apparent, in most circumstances no new layout need be defined for renderer 200 as the layout will be re-rendered, as necessary, with the appropriate document viewer and user interface components as needed. If a new layout is desired, it can be provided with the component and provided to renderer 200 as desired. This allows purchasers of the application program to purchase additional components, as needed. It is also contemplated that particular components with limited or special uses can be rented. Specifically, a DCOM or other component can be executed for a single use or for a predefined limited time, via the internet or other telecommunications network.

Another advantage of the present invention is that it enables the productization of components in a relatively simple manner. Specifically, different products can be constructed merely by changing the layout employed by renderer 200. For example, an expert product can have one layout wherein all available tools are displayed to the user, providing an efficient workspace, while a beginner product can have one or more layouts of fewer tools each and arranged by task providing a simplified workspace, albeit a less efficient one. Further, the expert product can include various tools and capabilities in addition to those provided with the beginner tool merely by including additional components and an appropriate layout. The present invention thus encourages the construction and implementation of component based application programs.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A computer implemented system for providing a graphical user interface, comprising: a non-transitory computer readable medium;
   a renderer defined to render a graphical user interface (GUI) for an application program;
   a proxy defined to provide each component necessary for rendering the GUI to the renderer, wherein the proxy appears to the renderer as a single monolithic application program, and wherein the proxy is defined to determine changes required to be made to the GUI for the application program during execution of the application program, wherein a given change determined by the proxy is one of rendering a new layout in the GUI and updating a present layout in the GUI; and
   a workflow manager defined to communicate one or more document viewers and associated user interface components to the proxy for provision to the renderer as components necessary for rendering the GUI,
   wherein the renderer, the proxy, and the workflow manager are executed from the non-transitory computer readable medium.

2. A computer implemented system for providing a graphical user interface as recited in claim 1, wherein the proxy enables details of each component which makes up the application program to be hidden from the renderer.

3. A computer implemented system for providing a graphical user interface as recited in claim 1, wherein the proxy enables each component which makes up the application program to be modified in a manner that is transparent to the renderer.

4. A computer implemented system for providing a graphical user interface as recited in claim 1, wherein each of the one or more document viewers includes functions to enable the renderer to display a current document in an appropriate format.

5. A computer implemented system for providing a graphical user interface as recited in claim 1, wherein each document viewer includes a respective user interface requirements specification referencing one or more user interface components associated with the document viewer.

6. A computer implemented system for providing a graphical user interface as recited in claim 1, wherein each document viewer is defined to register an associated workflow with the workflow manager upon instantiation of the document viewer, the workflow including methods, variables, and states to be shared among program components.

7. A computer implemented system for providing a graphical user interface as recited in claim 6, wherein the workflow manager is defined to register user interface components for each registered workflow.

8. A computer implemented system for providing a graphical user interface as recited in claim 1, further comprising:
   an active document manager defined to retrieve a document required by a workflow upon registration of the workflow with the workflow manager and communicate the retrieved document to the workflow manager for provision to the renderer through the proxy.

9. A method for providing a graphical user interface, comprising:
- operating a renderer to render a graphical user interface (GUI) for an application program;
- operating a proxy to provide each component necessary for rendering the GUI to the renderer, wherein the proxy appears to the renderer as a single monolithic application program, and wherein the proxy is defined to determine changes required to be made to the GUI for the application program during execution of the application program, wherein a given change determined by the ox is one of rendering a new layout in the GUI and updating a present layout in the GUI; and
- operating a workflow manager to communicate one or more document viewers and associated user interface components to the proxy for provision to the renderer as components necessary for rendering the GUI.

10. A method for providing a graphical user interface as recited in claim 9, wherein the proxy functions to hide details of each component which makes up the application program from the renderer.

11. A method for providing a graphical user interface as recited in claim 9, wherein the proxy functions to enable each component which makes up the application program to be modified in a manner that is transparent to the renderer.

12. A method for providing a graphical user interface as recited in claim 9, wherein each of the one or more document viewers includes functions to enable the renderer to display a current document in an appropriate format.

13. A method for providing a graphical user interface as recited in claim 9, wherein each document viewer includes a respective user interface requirements specification referencing one or more user interface components associated with the document viewer.

14. A method for providing a graphical user interface as recited in claim 9, further comprising:
- registering a workflow associated with each document viewer with the workflow manager upon instantiation of the document viewer, the workflow including methods, variables, and states to be shared among program components.

15. A method for providing a graphical user interface as recited in claim 14, wherein the workflow manager functions to register user interface components for each registered workflow.

16. A method for providing a graphical user interface as recited in claim 9, further comprising:
- operating an active document manager to retrieve a document required by a workflow upon registration of the workflow with the workflow manager, further operating the active document manager to communicate the retrieved document to the workflow manager for provision to the renderer through the proxy.

* * * * *